United States Patent
Kim et al.

(10) Patent No.: US 12,475,398 B2
(45) Date of Patent: Nov. 18, 2025

(54) ACTIVE STABILIZATION OF COHERENT CONTROLLERS USING NEARBY QUBITS

(71) Applicants: University of Maryland, College Park, College Park, MD (US); Duke University, Durham, NC (US)

(72) Inventors: Jungsang Kim, Chapel Hill, NC (US); Kenneth Brown, Durham, NC (US); Christopher Monroe, Ellicott City, MD (US)

(73) Assignees: UNIVERSITY OF MARYLAND, COLLEGE PARK, College Park, MD (US); DUKE UNIVERSITY, Durham, NC (US)

( * ) Notice: Subject to any disclaimer, the term of this patent is extended or adjusted under 35 U.S.C. 154(b) by 0 days.

(21) Appl. No.: 18/637,172

(22) Filed: Apr. 16, 2024

(65) Prior Publication Data

US 2024/0378472 A1    Nov. 14, 2024

Related U.S. Application Data

(62) Division of application No. 17/362,810, filed on Jun. 29, 2021, now Pat. No. 12,288,132.

(60) Provisional application No. 63/046,559, filed on Jun. 30, 2020.

(51) Int. Cl.
  *G06N 10/40* (2022.01)
(52) U.S. Cl.
  CPC .................. *G06N 10/40* (2022.01)
(58) Field of Classification Search
  CPC .............................. G06N 10/40; B82Y 10/00
  See application file for complete search history.

(56) References Cited

U.S. PATENT DOCUMENTS

| | | | |
|---|---|---|---|
| 10,354,198 B1 * | 7/2019 | Filipp | H10N 60/805 |
| 10,452,991 B1 * | 10/2019 | Ganzhorn | B82Y 10/00 |
| 10,951,002 B1 * | 3/2021 | Bohn | H01S 3/0085 |

(Continued)

OTHER PUBLICATIONS

Schmidt-Kaler F et al., "Coherence of qubits based on single Ca/\\+ ions", arxiv.org, Cornell University Library, 201 Olin Library Cornell University Ithaca, NY 14853, Nov. 11, 2002.

(Continued)

*Primary Examiner* — Nha T Nguyen
(74) *Attorney, Agent, or Firm* — ARENTFOX SCHIFF LLP

(57) ABSTRACT

Aspects of the present disclosure describe techniques that involve an active stabilization of coherent controllers using nearby qubits. In an aspect, a quantum information processing (QIP) system for stabilizing phase damping in qubits is described that provides a first and a second qubit ion, measuring magnetic field fluctuations using the second qubit ion, and generates one or more magnetic fields based on the measured magnetic field fluctuations, the one or more magnetic fields being applied near the first qubit ion to cancel the magnetic field fluctuations to stabilize the phase damping of the first qubit ion. Another such QIP system performs provides a first and a second qubit ion, locks a local oscillator to a frequency reference associated with the second qubit ion, and tracks, using the local oscillator, a frequency of the first qubit ion based on the frequency reference. Methods associated with these QIP systems are also described.

20 Claims, 12 Drawing Sheets

(56) References Cited

U.S. PATENT DOCUMENTS

| | | | | |
|---|---|---|---|---|
| 11,906,351 B1* | 2/2024 | Gehl | ............... | G02B 6/132 |
| 2017/0344898 A1 | 11/2017 | Karimi et al. | | |
| 2018/0225586 A1* | 8/2018 | Chow | ............... | G06N 10/20 |
| 2019/0347576 A1* | 11/2019 | von Salis | ............... | G06N 10/20 |
| 2020/0119254 A1 | 4/2020 | Oblesh et al. | | |
| 2020/0167684 A1 | 5/2020 | Frisch et al. | | |
| 2020/0219001 A1 | 7/2020 | Kim et al. | | |
| 2021/0026162 A1* | 1/2021 | Apisdorf | ............... | G02F 1/017 |
| 2021/0117845 A1* | 4/2021 | Choi | ............... | G06N 10/40 |
| 2021/0257969 A1* | 8/2021 | Bardin | ............... | G06N 10/40 |
| 2021/0258079 A1* | 8/2021 | Lauer | ............... | G06N 10/60 |
| 2021/0311442 A1* | 10/2021 | Biercuk | ............... | G06F 3/0482 |
| 2022/0120629 A1* | 4/2022 | Pisenti | ............... | G01L 21/30 |

OTHER PUBLICATIONS

Sepiol M A et al., "Probing Qubit Memory Errors at the Part-per-Million Level", arxiv.org, Cornell University Library, 201 Olin Library Cornell University Ithaca, NY 14853, May 16, 2019.

International Search Report and Written Opinion issued for Int'l Appl. No. PCT/US2021/039777, Int'l Filing Date Jun. 30, 2021, mailed Jun. 30, 2022.

Office Action received for Japanese Patent Application No. 2022-578938, mailed on Feb. 25, 2025, 8 pages (5 pages of English Translation and 3 pages of Original Document).

\* cited by examiner

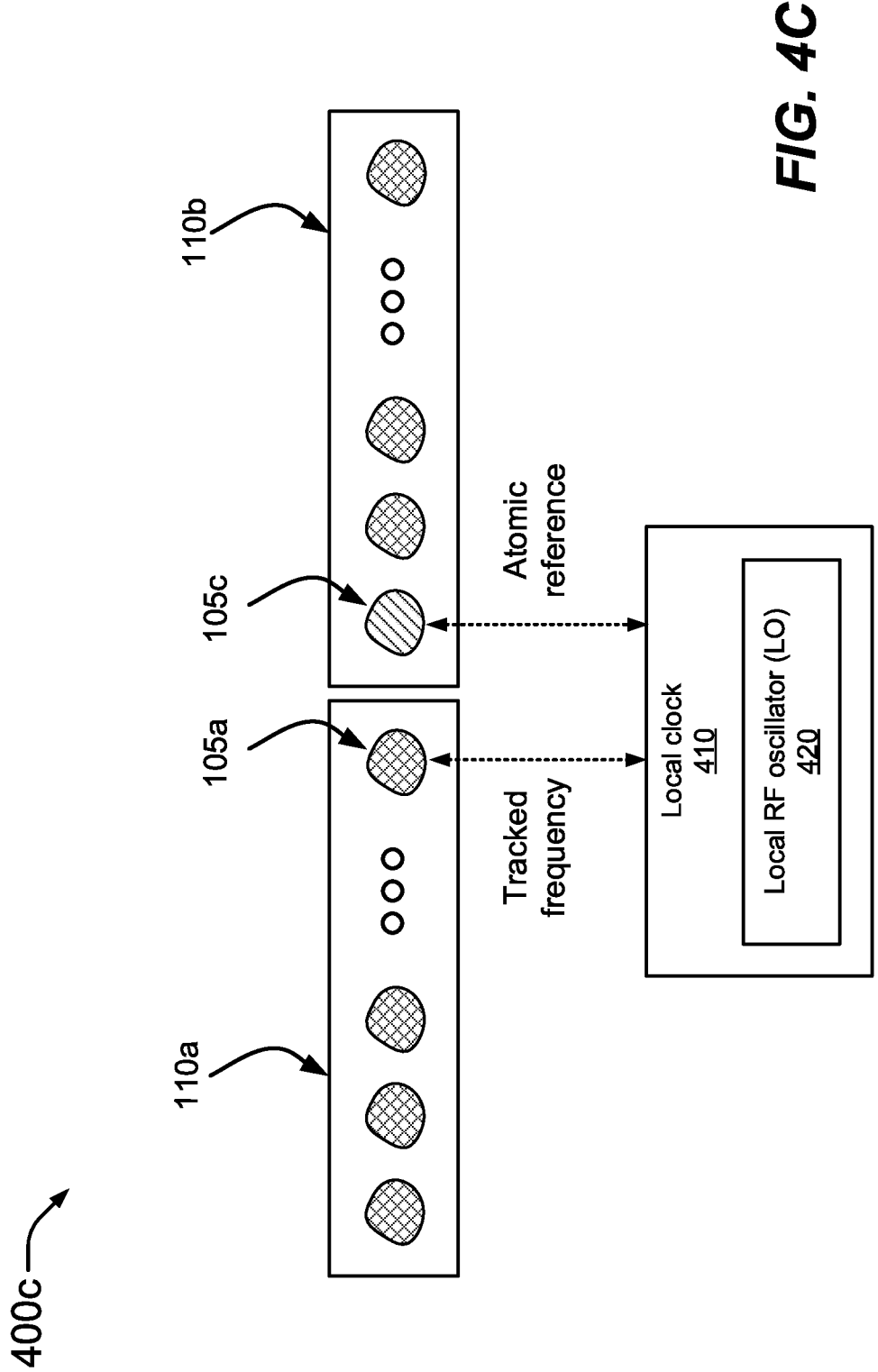

ACTIVE STABILIZATION OF COHERENT CONTROLLERS USING NEARBY QUBITS

CROSS REFERENCE TO RELATED APPLICATIONS

The present application is a divisional application of U.S. patent application Ser. No. 17/362,810, filed Jun. 29, 2021, which claims priority to and the benefit of U.S. Provisional Patent Application No. 63/046,559, entitled "ACTIVE STABILIZATION OF COHERENT CONTROLLERS USING NEARBY QUBITS," and filed on Jun. 30, 2020, the contents of which are incorporated herein by reference in their entirety.

GOVERNMENT LICENSE RIGHTS

This invention was made with government support under Award No. W911NF-18-1-0218 by Army Research Office (ARO) and Award No. 3130638 by the Intelligence Advanced Research Projects Activity (IARPA). The government has certain rights in the invention.

BACKGROUND

Aspects of the present disclosure relate generally to controlling of mechanisms that may result in qubit degradation, and more specifically, to techniques that involve an active stabilization of coherent controllers using nearby qubits.

Atomic hyperfine qubits are unique compared to other solid-state qubits (e.g., superconducting qubits) in that the quality of the qubits (e.g., the stability of the qubit over time) can be made close to perfect, as long as the qubits can be perfectly isolated. The two mechanisms representative of degradation in a qubit, the amplitude damping measured by a relaxation time $T_1$ and the phase damping measured by a relaxation time $T_2$, are generally limited by various system parameters. The shorter in duration that $T_1$ and $T_2$ are, the shorter the duration a qubit is sufficiently stable to be used for performing quantum computations.

Therefore, it is desirable that techniques be developed to make $T_1$ and $T_2$ longer in duration to improve the stability of qubits for use in quantum computations.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure, a method for stabilizing phase damping in qubits is described that includes providing a first qubit ion and a second qubit ion, measuring magnetic field fluctuations using the second qubit ion, and generating one or more magnetic fields based on the measured magnetic field fluctuations, the one or more magnetic fields being applied near the first qubit ion to cancel the magnetic field fluctuations to stabilize the phase damping of the first qubit ion.

In another aspect of this disclosure, a trapped ion quantum information processing (QIP) system is described that includes at least one ion trap having a first qubit ion and a second qubit ion, one or more coils, and a stabilizer for stabilizing phase damping in qubits, where the stabilizer is configured to measure magnetic field fluctuations using the second qubit ion, and to generate, using the one or more coils, one or more magnetic fields based on the measured magnetic field fluctuations, the one or more magnetic fields being applied near the first qubit ion to cancel the magnetic field fluctuations to stabilize the phase damping of the first qubit ion.

In another aspect of this disclosure, a method for stabilizing phase damping in qubits is described that includes providing a first qubit ion and a second qubit ion, locking a local oscillator to a frequency reference associated with the second qubit ion, and tracking, using the local oscillator, a frequency of the first qubit ion based on the frequency reference.

In another aspect of this disclosure, a trapped ion QIP system is described that includes at least one ion trap having a first qubit ion and a second qubit ion, and a local oscillator, where the local oscillator is locked to a frequency reference associated with the second qubit ion, and where the local oscillator is configured to track a frequency of the first qubit ion based on the frequency reference.

In yet another aspect of this disclosure, a computer-readable storage medium storing code with instructions executable by a processor is described for stabilizing phase damping in qubits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 4A-4C are diagrams illustrating examples of using a collocated atomic hyperfine qubit as a frequency reference in accordance with aspects of this disclosure.

DETAILED DESCRIPTION

Figure 1:
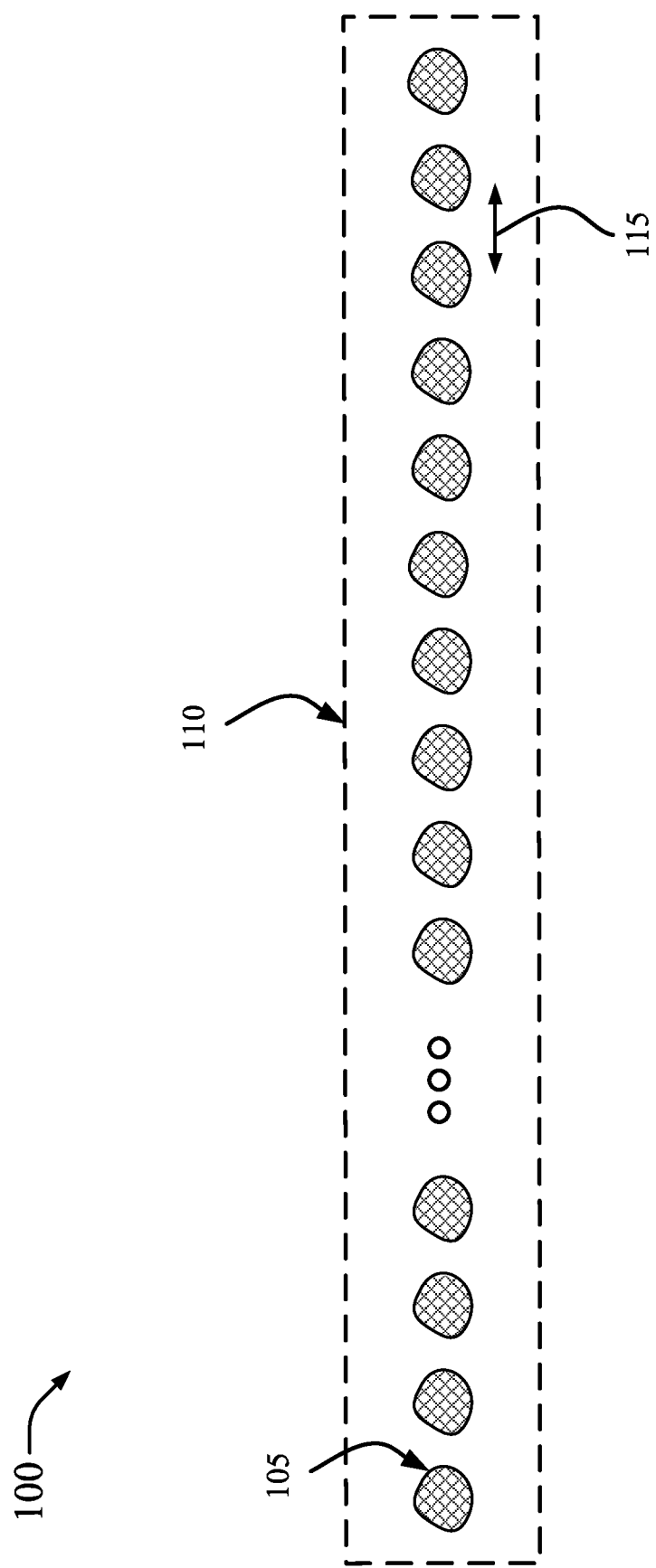
FIG. 1 illustrates a view of trapped atomic ions in a linear crystal or chain in accordance with aspects of the disclosure.
Figure 2:
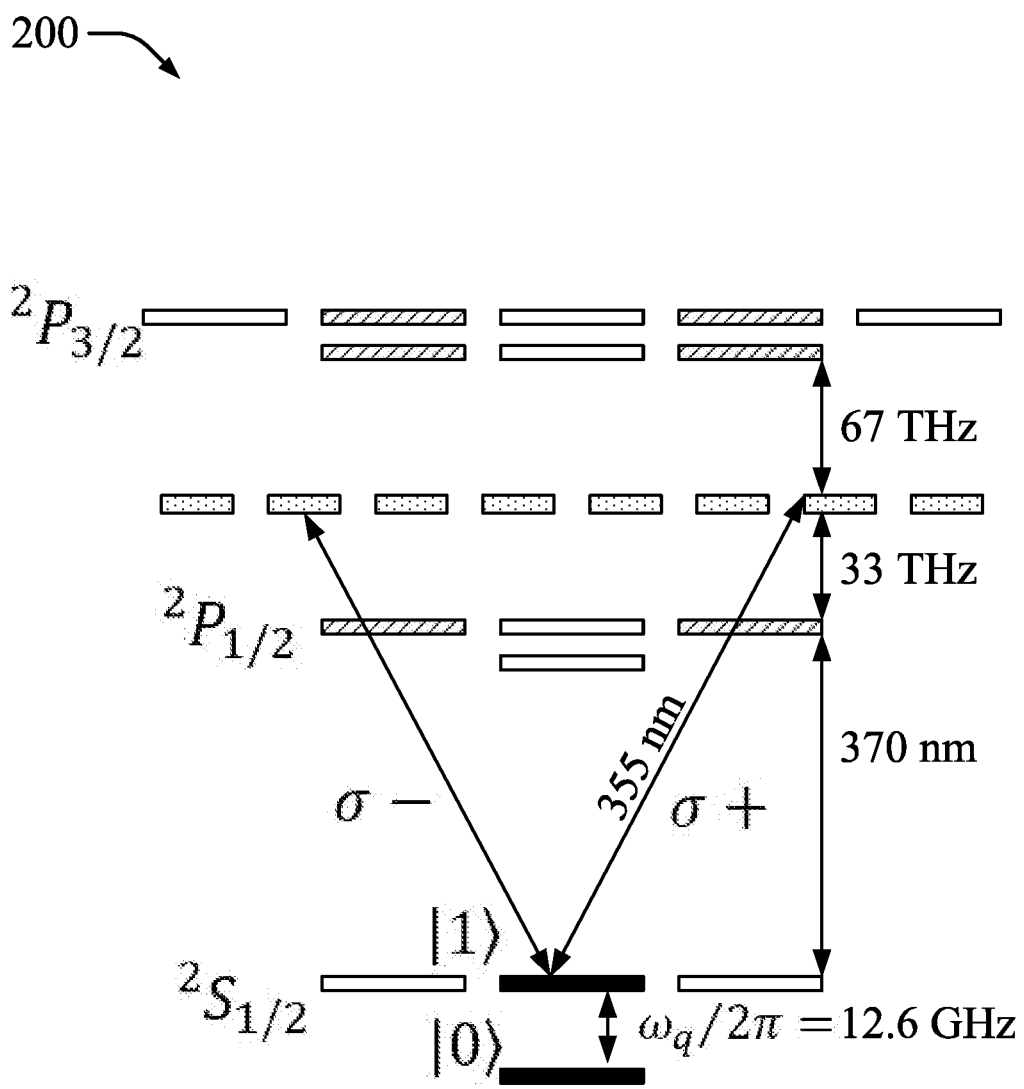
FIG. 2 is a diagram illustrating an example of energy levels in an atomic hyperfine qubit in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form to avoid obscuring such concepts.

The detailed description includes techniques that may be used to eliminate phase errors in a collection of atomic qubits by sacrificing one or more of the qubits as local oscillator atomic clocks that can be used to track the phases of all the other qubits. This eliminates almost all idle decoherence in particular qubits in the collection of qubits. Atomic qubits may generally refer to atomic-based qubits, including atomic ion qubits, for example. As mentioned above, atomic hyperfine qubits are unique compared to other solid-state qubits in that the quality of the qubits can be made close to perfect, if the qubits can be perfectly isolated. The two mechanisms for qubit degradation, the amplitude damping measured by $T_1$, and the phase damping measured by $T_2$, can be made arbitrarily long to improve the stability of qubits for use in quantum computations.

In general, a quantum bit (qubit) can be described by the following expression:

$$|\psi\rangle = \cos\frac{\theta}{2}|0\rangle + e^{i(\omega t + \phi)}\sin\frac{\theta}{2}|1\rangle.$$

Therefore, a qubit can be generally represented by two parameters, $\theta$ and $\phi$, where $\theta$ is a relative weight and $\phi$ is a relative phase. There are different types of qubits. One type of solid-state qubit is a superconducting qubit and another type is an atomic hyperfine qubit. The atomic hyperfine qubit usually has two levels (qubit levels) associated with the qubit states $|0\rangle$ and $|1\rangle$. There is an energy difference between these two levels that is characterized by a frequency, $\omega$, which is part of the qubit expression described above. Since this frequency is associated with a qubit, it may be referred to as a qubit frequency or $\omega$. In most qubits, both of the parameters described above ($\theta$ and $\phi$) can degrade or become less stable over time and, consequently, a qubit tends to have a certain lifetime within which quantum computations can be performed.

The decay of the relative amplitude ($\theta$) results from the tendency to go from a population of higher energy to one of lower energy. In nuclear magnetic resonance (NMR) this type of decay in a two-level system is characterized by a relaxation time $T_1$, which is a measurement of an amplitude damping. Separate from the relative amplitude, the two-level system has an energy difference and therefore an inherent frequency time dependence, where the frequency is the qubit frequency $\omega_q$ as described above. Thus, if this energy difference of the system is stable, if it does not move or fluctuate at all, then $\omega$ t is predictable and can be ignored because knowledge of the qubit frequency allows for exact knowledge of the behavior of the qubit at any point in time. So when reference is made to the relative phase $\phi$, it is a reference to the expression $e^{i(\omega t + \phi)}$ in the case where $\omega$ t can be ignored given that the qubit frequency is known and the motion is therefore entirely predictable.

In a real qubit system, however, the energy difference in the two-level system can fluctuate. This fluctuation can be reflected in the qubit frequency and can result in the accumulation of some phase uncertainty over time because it is not known exactly how the qubit frequency is fluctuating and the motion is no longer predictable. This is how the source of the relative phase can be lost for a qubit. For example, a local clock or local oscillator can be used to count the oscillations (e.g., the frequency) of the qubit and that local clock runs at a specified frequency, generally based on an atomic source or atomic reference. If a qubit is running off of this local clock and there is no knowledge of the energy fluctuations in the qubit, then there is a likelihood that some uncertainty has accumulated and that uncertainty causes dephasing between the local clock and the qubit. That is, dephasing occurs between the local clock (or the local oscillator) and the qubit when the phase of the qubit has shifted without any knowledge of the phase shift. In NMR, this dephasing is characterized by a relaxation time $T_2$, which is a measurement of phase damping. $T_2$ is therefore a measurement of a time scale during which coherence is maintained, that is, before losing track of the phase of the qubit as a result of the dephasing between the local clock and the qubit.

In superconducting qubits, this coherence can be typically maintained for about 1 nanosecond (ns), with more recent results achieving as high as 50 microseconds (µs) of coherence. These types of qubits, however, are intrinsically coupled to the environment since they are made out of circuits. If these types of qubits end up being coupled to a nearby electric field, or if even one atom moves, then it becomes very difficult to know the fluctuations in the qubit frequency and the amount of uncertainty being accumulated in the phase.

In contrast to how superconducting qubits are structured, an atomic hyperfine qubit uses two ground states of an atom (or an atomic ion) separated by hyperfine interaction. The hyperfine splitting is all in the ground state and is caused by the interaction of the nucleus spin, which is very well isolated from the environment. In these types of qubits, the intrinsic $T_1$ time is measured in many thousands of years (e.g., as long as 10,000 years), significantly longer than anything that can be achieved with a superconducting qubit. Given the extremely long-time scales of $T_1$ in atomic hyperfine qubits, it is very unlikely that spontaneous decay is to occur within most quantum operations. For all practical purposes, a spontaneous decay is not likely to happen in atomic hyperfine qubits, which is not the case for superconducting qubits.

In practice, however, the length of time for $T_1$ can be limited by collisions with residual gas molecules in a vacuum chamber. These gases can collide with a qubit and flip the nucleus spin affecting the qubit. It may be difficult to achieve the improvements in vacuum that would avoid collisions for the 10,000 years that an atomic hyperfine qubit can go without decay in $T_1$, but it is possible to achieve a vacuum that can have one collision every 30 minutes to an hour, with the further possibility of extending collision rates to one every day or longer. With these longer collision time scales, it is clear that $T_1$ is not likely to be a factor in atomic hyperfine qubits as long as good vacuum is provided.

On the other hand, $T_2$ is determined by the ability to track the time-dependent relative oscillations that two qubit states experience with respect to each other, which in turn is determined by the energy difference between the two qubit levels. $T_2$, therefore, can be more of a challenge to improve since the energy difference can be affected by background noise such as electric or magnetic hum noise (e.g., 50 Hz, 60 Hz, 100 Hz or 120 Hz depending on the local power-line frequency). For atomic hyperfine qubits, $T_2$ can be about 1 second, where the value of $T_2$ relates to the energy or phase of the qubit with respect to a local clock.

In today's standard metrology, local clocks used in quantum computations can be based on Cesium (Cs) atomic clocks, which are used to define a second (e.g., to define a unit of time). The Cesium atom has a similar hyperfine structure (e.g., similar physical characteristics) as the structure of the atoms used for hyperfine qubits (e.g., Ytterbium atoms). That is, in the Cesium atom, the electron spin is coupled to the nucleus spin to form a hyperfine splitting. Two of the states in the Cesium atom can then be used to define a second based on the hyperfine interaction between the two states. The choice of Cesium may be somewhat arbitrary and other atomic species with similar hyperfine ground states, such as Rubidum (Rb) atoms or $^{171}Yb^+$, $^{133}Ba^+$ or $^{43}Ca^+$ atomic ions, could be just as good of a reference by which to define a second (or frequency). In an example that is typically used, the local clock or local oscillator is tied to a Rb atomic clock and locks to the Rb transition to produce a frequency of approximately 6.3 GHz.

As described in more detail below, rather than using a Cs atomic clock or even an Rb atomic clock as an absolute frequency reference (e.g., atomic source or atomic reference) for a local clock, an atomic hyperfine qubit can be used instead as an absolute atomic clock for quantum computations. That is, the local clock can use as a frequency reference for defining time the structure of one of the atomic hyperfine qubits and not to a commercial atomic clock. In such a case, instead of tying time to a Cs or Rb atom, time may be tied to an Ytterbium atom in an atomic hyperfine qubit. When this is done, $T_2$ will be continuously in phase because any changes to the Ytterbium-based hyperfine qubit that is being tracked are similarly experienced by the atomic hyperfine qubit that is being used as a frequency reference.

As mentioned above, for the case of atomic hyperfine qubits, where $T_2$ can typically be about 1 second, tying time to an atomic hyperfine qubit instead of to a Cs or Rb atomic clock can make a local clock very accurate and improve $T_2$. On the other hand, for superconducting qubits, for which $T_2$ is in the order of 50 µs, the accuracy of the local clock is less of a concern. When $T_2$ is in the order of 1 second, or tens of seconds, the local clock may need to be accurate to $10^{-11}$ and that can end up being a steep requirement. In the case of Rb atomic clocks, for example, accuracies as high as $10^{-12}$ can be achieved today, and it is possible to expect that tying time to an atomic hyperfine qubit can improve the accuracy of the local clock to as much as $10^{-18}$, which means it is possible to achieve accuracy that is as much as six orders of magnitude greater than what is typically achievable today. This also means that $T_2$ can be extended from 1 second to 1 million seconds for atomic hyperfine qubits. However, a slip from the reference frequency that is provided may come down to how well the tying of the time to a reference atomic hyperfine qubit is done. The sloppier this tying is the more likely there is a drift in the phase and dephasing is to occur. Accordingly, a good tying of the time to a reference atomic hyperfine qubit is important to take advantage of the benefits of using an atomic hyperfine qubit as the atomic reference for the local clock.

As mentioned above, there may be other mechanisms that affect $T_2$ by causing fluctuations in the energy difference of atomic hyperfine qubits, such as the presence of 60 Hz noise (or other noise frequencies) from power lines, for example. By having better isolation, for example, by shielding 60 Hz magnetic field from coupling to the qubits, it is possible to extend $T_2$ (e.g., from 1 second to 1000 or more). This can be achieved by simply implementing better magnetic field shielding, without even considering the additional benefits of better tying the local clock (e.g., a radio frequency (RF) oscillator) to a Rb atom-based atomic clock, and also without considering improvements that may result by tying the local clock to an atomic hyperfine qubit instead of a Cs atom-based atomic clock or a Rb atom-based atomic clock. In other words, a combination of good tying techniques, better shielding, and the use of an atomic hyperfine qubit as a frequency reference, whether performed individually or in combination, can provide much needed improvements to $T_2$.

Qubits based on superconducting structures cannot make the kinds of improvements to $T_1$ and $T_2$ that can be achieved in atomic hyperfine qubits, where at least some of those improvements are based on the various techniques described in this disclosure. For example, improvements in $T_1$ for atomic hyperfine qubits are mostly about providing better vacuum to reduce the rate of collisions and approach the 10,000-year time scale. $T_2$ is limited by how well of a tie is made between an RF oscillator and an atomic clock (e.g., a Rb atom-based clock or a Cs atom-based clock) and by environmental fluctuations (e.g., 60 Hz magnetic field noise) that can couple into the qubit energy (e.g., the energy difference between energy levels). As described above, in order to improve the $T_2$ time scale, the solutions that are needed are to make sure that a classical RF oscillator gets locked into the atomic reference as tightly as possible, which is a system implementation issue, and to avoid fluctuations caused by environmental effects by providing good shielding. These can be implemented independently or in combination. Also as described herein, the $T_2$ time scale can be improved by having the classical RF oscillator tied to an atomic hyperfine qubit reference.

This disclosure describes details on how to improve the stability of the atomic reference by using one or more of the qubits in a chain of quits (e.g., a chain of atomic hyperfine qubits) to measure a local environmental condition (e.g., a local magnetic field) near the remaining qubits in the chain such that the overall system can cancel out the effects of the local environmental condition. For example, if the qubits in a chain are Ytterbium-based qubits, one or more of the Ytterbium-based qubits can be used to measure the local magnetic field (e.g., fluctuations or changes in the local magnetic field). The qubits in the chain are typically separated by about 5 microns, making the overall chain approximately 200 microns for a 32-qubit implementation. Given the relative proximity of the qubits in the chain or in a nearby chain, using any one of the qubits may provide accurate readings of the local magnetic field affecting all of the qubits, particularly because the wavelength of 60 Hz noise is much longer than the chain and its effect on the qubits is probably very much the same. The qubit or qubits being used for probing or measuring the local magnetic field need not be Ytterbium-based qubits and can be qubits based on a different atom or species.

As mentioned above, in atomic hyperfine qubits two levels are used for the qubit states $|0\rangle$ and $|1\rangle$. These levels, however, tend to be mostly insensitive to magnetic fields. Other levels in the hyperfine structure are more sensitive to magnetic fields and may be used to make the local magnetic field measurements. These other levels can be as much as 10,000 times more sensitive to magnetic fields than the levels used for the qubit states $|0\rangle$ and $|1\rangle$. Once the magnetic field is measured using these other levels, a form of feedback control can be implemented to stabilize the magnetic fields by nulling out the effect of the local magnetic fields. By doing so, the energy levels that are mostly insensitive to magnetic fields (e.g., qubit states $|0\rangle$ and $|1\rangle$)

can become even less sensitive. For example, if the magnetic field nulling process reduces the local magnetic field by 1 part in 10,000, then the energy levels that are mostly insensitive to magnetic fields (e.g., the qubit states $|0\rangle$ and $|1\rangle$) can be made even less sensitive by 3 or 4 orders of magnitude.

Therefore, as proposed by this disclosure, it is possible to use one or more of the qubits in the chain, which can be the same qubit type as used for quantum computations or a different qubit type (e.g., a spectator qubit in the chain), to probe the local environment (e.g., to probe or measure the local magnetic field), and use the results from the probing to provide an extremely stable environment as seen by the qubits in the chain. Accordingly, two things that can be done to avoid fluctuations caused by environmental effects are first to provide good magnetic field shielding and second to use a nearby qubit to probe the local environment to stabilize it. One or more of the qubits in the chain would then be less affected by the local magnetic fields as a result of the shielding and the stabilization by local probing.

As mentioned above, another improvement is to have the local clock or local oscillator locked to one or more of the atomic hyperfine qubits, and because of the better magnetic field shielding and/or the stabilization of the qubit, the reference qubit can be an even more stable qubit to use as a frequency reference. This qubit may still fluctuate a bit, although perhaps now 3 or 4 orders of magnitude less than before because of the magnetic field stabilization achieved by better shielding and local magnetic field nulling. If the local oscillator is now locked to one or more stable qubits, even if it still fluctuates a bit, both the qubit and the local oscillator move together such that the fluctuations no longer matter (e.g., dephasing no longer occurs). So by tying the local oscillator to the qubit itself, or to a nearby qubit, sometimes called a spectator qubit that is nearby but does not participate in quantum computations, fluctuations in the qubit may not cause dephasing because the local oscillator sees the same fluctuations. That is, the device that is being used to count oscillations (e.g., the local clock or local oscillator) and the entity that is being counted (e.g., the qubit) are locked to each other. This can significantly extend the coherence of the system and therefore the time scale of $T_2$.

Thus, atomic hyperfine qubits provide some unique advantages compared to other solid-state qubits (e.g., superconducting qubits) in that the quality of the qubits can be made close to perfect, as long as the qubits can be perfectly isolated. The two mechanisms for qubit degradation, the amplitude damping measured by $T_1$ and the phase damping measured by $T_2$, can be significantly improved by using the various techniques described in this disclosure. Improvements in vacuum would be helpful but, the vacuum that can be currently achieved may be sufficiently good that it does not limit the $T_1$ of the qubits for most applications. As the size of the quantum computers or quantum information processing systems get larger (e.g., more qubits) and the computations get longer, it may be necessary to continue to improve the collision rate. The main limitation for the qubit today is the $T_2$ time, due to (1) residual magnetic field fluctuations, mostly dominated by the 60 Hz noise from power lines, and (2) the ability to stabilize/lock a (classical) experimental clock (e.g., local clock or local oscillator) frequency to match the qubit frequency.

Various aspects associated with solutions to the issues described above are explained in more detail below in connection with FIGS. 1-8.

FIG. 1 shows a diagram 100 that illustrates multiple atomic ions 105 (e.g., for use as atomic hyperfine qubits) trapped in a linear crystal or chain 110 using a linear RF Paul trap, simply referred to as an ion trap, which is typically inside a vacuum chamber. These atomic ions 105 can then be used as qubits for quantum computation (e.g., qubits 105). In the example shown in FIG. 1, a vacuum chamber in a quantum system includes electrodes for trapping multiple (e.g., N>1, where N is a number as large as 100 or even larger, with some implementations having N=32) atomic Ytterbium ions (e.g., $^{171}Yb^+$ ions) which are confined in the chain 110 and are laser-cooled to be nearly at rest. The number of atomic ions trapped can be configurable and more or fewer atomic ions may be trapped. The atoms are illuminated with laser (optical) radiation tuned to a resonance in $^{171}Yb^+$ and the fluorescence of the atomic ions is imaged onto a camera. In this example, atomic ions are separated by a distance 115 of about 5 microns (μm) from each other as shown by fluorescence. The distance 115 can range from about 3 μm to 6 μm, for example. The separation of the atomic ions is determined by a balance between the external confinement force and Coulomb repulsion. Simple atomic ions with a lone outer electron, such as the alkaline-earths ($Be^+$, $Mg^+$, $Ca^+$, $Sr^+$, $Ba^+$) and particular transition metals ($Zn^+$, $Hg^+$, $Cd^+$, and $Yb^+$) may be used in the chain 110. Within these atomic ions, qubits can be represented by two stable electronic levels, often characterized by an effective spin with the two qubit states $|\uparrow\rangle$ and $|\downarrow\rangle$), or equivalently $|1\rangle$ and $|0\rangle$.

The required polarization of Raman beams to drive transitions in the qubit depends on the atomic structure of the qubit levels and their couplings to excited states. As an example, the disclosure considers the $^{171}Yb^+$ system (e.g., an atomic hyperfine system) shown in an energy level diagram 200 in FIG. 2 in which coherent stimulated Raman transitions couple the two qubit states labeled $|0\rangle$ and $|1\rangle$ and separated by frequency $\omega_q$ (e.g., $\omega_q/2\pi=12.6$ GHz), driven by laser fields at 355 nm with either $\sigma_+/\sigma_+$ or $\sigma_-/\sigma_-$ polarizations for the two Raman beams (e.g., any Raman process is driven with both beams polarized $\sigma_+$ or $\sigma_-$). In addition to the energy levels of the two qubit states $|0\rangle$ and $|1\rangle$, the diagram 200 also shows other energy levels, some of which may be significantly more sensitive to magnetic fields or other environmental conditions than the energy levels used for the qubit states. As mentioned above, other systems that have a similar hyperfine structure as the one for the $^{171}Yb^+$ system may also be used in connection with the various techniques described in this disclosure.

Figure 3A:
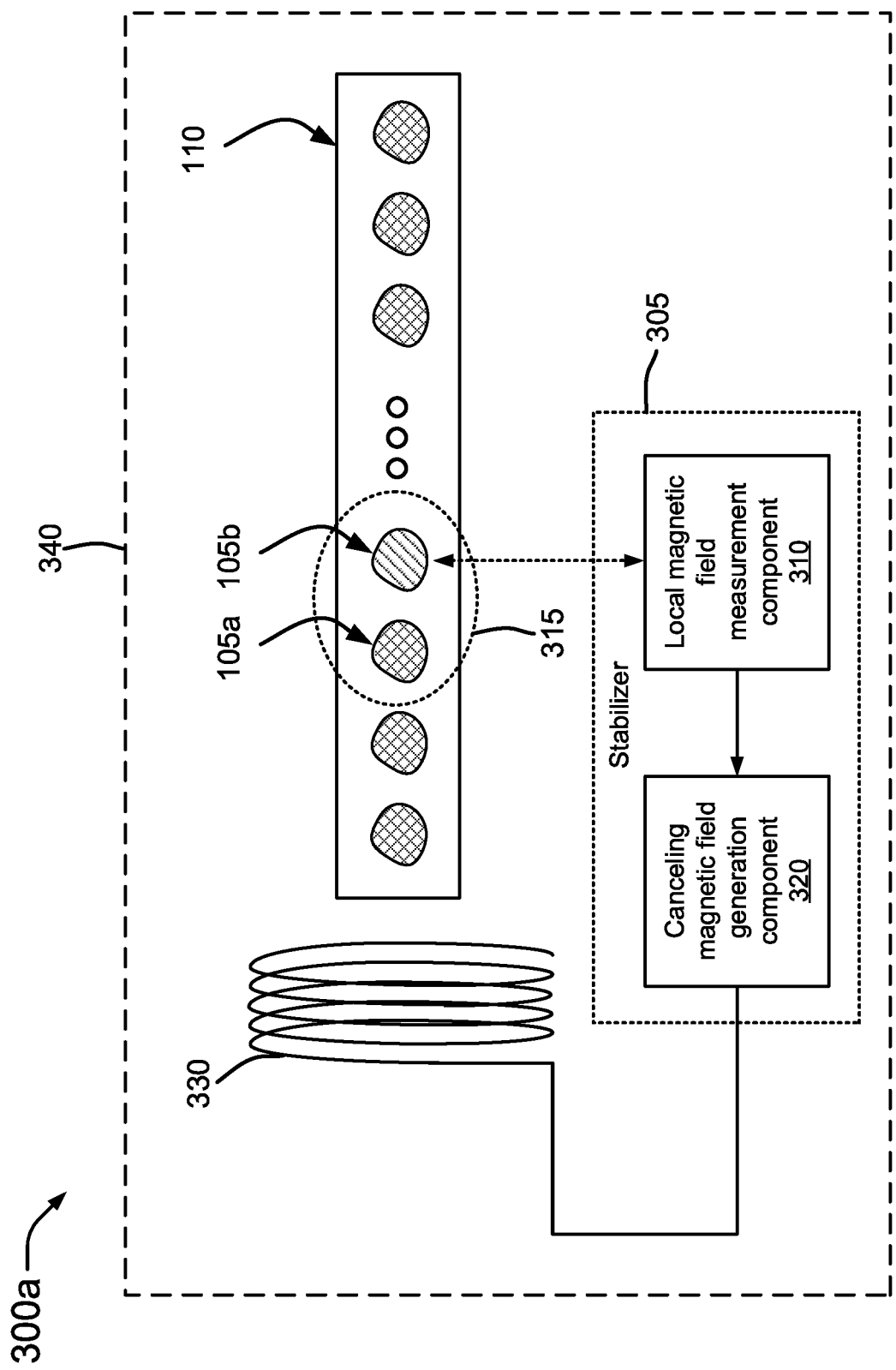
FIGS. 3A-3C are diagrams illustrating examples of local magnetic field cancelation in accordance with aspects of this disclosure.
Figure 3B:
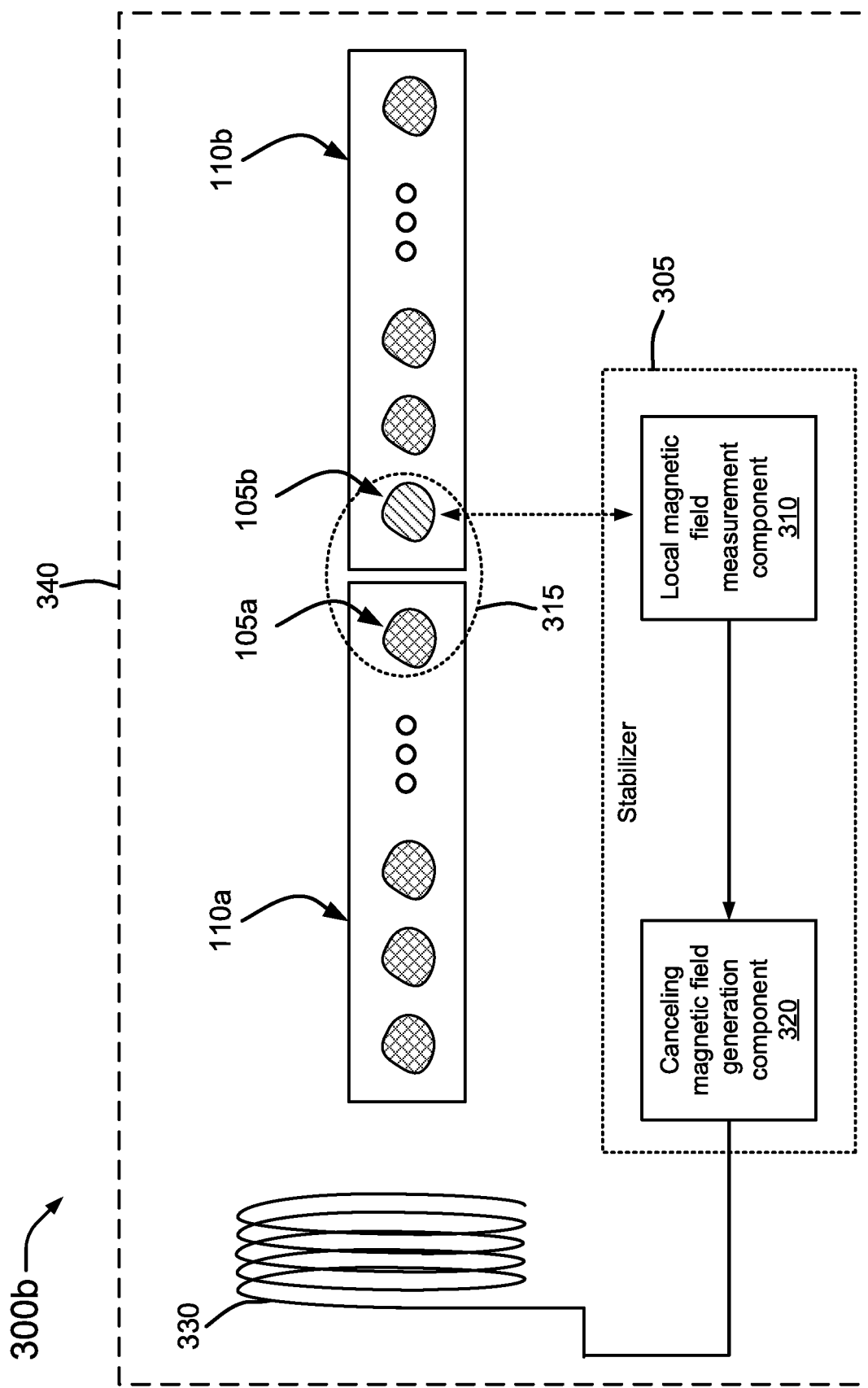
Figure 3C:
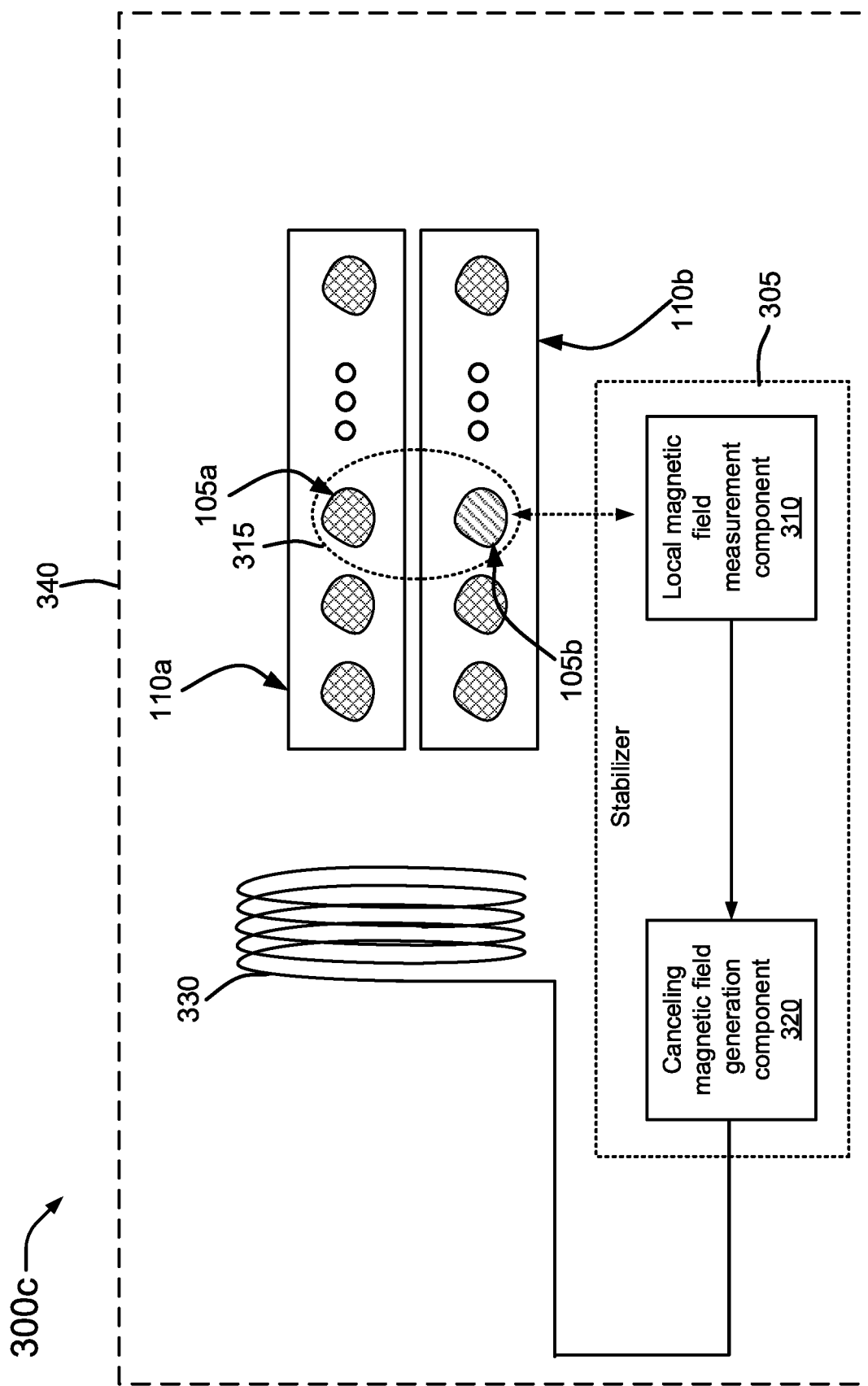

FIGS. 3A-3C shows diagrams 300a-300c, respectively, which illustrate various examples of local magnetic field cancelation or nulling in accordance with aspects of this disclosure. In general, to stabilize the effects of the magnetic field, the first thing to do is to build a magnetic shield around the qubits using materials with high magnetic permeability (e.g., the mu metal, or highly conductive copper or superconducting material at cryogenic temperatures). The magnetic field can be further stabilized by using another atom co-trapped with the qubit ions (or in a very nearby trap), and using atomic energy levels that are extremely sensitive to the magnetic field (unlike the qubit states that are highly insensitive to magnetic field), to measure the local magnetic field for the qubits. Then, a feedback loop can be implemented to add cancellation magnetic fields to stabilize the local magnetic field environment.

The diagram 300a describes an implementation of a stabilization technique for improving the overall time scale of $T_2$ for one or more qubits 105 in a chain 110 by reducing the amount of the magnetic field near the qubits 105.

One aspect of the stabilization technique is to use a magnetic field shield 340 to reduce the amount of magnetic field (e.g., magnetic field fluctuations) experienced by the qubits 105 in the chain 110. The magnetic field shield 340 (also referred to more simply as a magnetic shield) may be used for shielding the qubits 105 against static or low-frequency magnetic fields. The magnetic field shield 340 may be made of a material with high magnetic permeability including one or more of mu-metal, highly conductive copper, or a superconducting material at cryogenic temperatures. A mu-metal may consist of a nickel-iron soft ferromagnetic alloy with very high magnetic permeability.

In this example, the qubit 105*a*, which may be an atomic hyperfine qubit, may be used for quantum computations. Improvements in the stability of the qubit 105*a* (e.g., a better $T_2$ assuming that the vacuum provided is enough to avoid any limitations in $T_1$) may help the overall performance of the quantum system carrying out the quantum computations. The qubit 105*b* may be another hyperfine qubit that is adjacent or nearby the qubit 105*a* so that it experiences the same local environmental conditions as the qubit 105*a*. The qubits 105*a* and 105*b* may be said to be collocated qubits. The qubit 105*b* may be referred to as a probing qubit (e.g., the probing qubit 105*b*). Although shown next to the qubit 105*a*, the probing qubit 105*b* need not be immediately adjacent to the qubit 105*a* as long as it is sufficiently close to experience the same environmental conditions. The probing qubit 105*b* may not be involved in the quantum computations of the qubit 105*a* and may be considered instead a spectator qubit. Accordingly, the probing qubit 105*b* may be used to measure or probe a local magnetic field 315 that affects the qubit 105*a*. As noted above, the fluctuation of local magnetic field 315 is lower than it would have otherwise been because of the use of the magnetic field shield 340. Moreover, the probing qubit 105*b* may be based on a different atom or ion from that of the qubit 105*a*, in terms of atomic species or isotope.

A stabilizer 305 may be used to provide a feedback mechanism to cancel or null the local magnetic field 315. The stabilizer 305 may include a local magnetic field measurement component 310 that is configured to measure or probe the local magnetic field 315 using energy levels in the qubit 105*b* that are sensitive to magnetic fields. Although not shown, the local magnetic field measurement component 310 may include and/or may control various optical sources and/or elements to make the measurements. The stabilizer 305 may also include a canceling magnetic field generation component 320 that is configured to receive information from the measurements made by the local magnetic field measurement component 310 and used that information to generate signals that are applied to one or more coils 330 to produce one or more magnetic fields to cancel or null (or at least significantly reduce) the local magnetic field 315. In one implementation, the one or more coils 330 may be present in the quantum computer or quantum information processing system to address other magnetic fields such as the earth's magnetic field and may also be used to stabilize the qubits 105 as described above. In another implementation, the one or more coils 330 may be uniquely configured to be used for stabilizing the qubits 105 and a separate set of coils may be used to address other magnetic fields.

The diagrams 300*b* and 300*c* describe other implementations to stabilize the time scale of $T_2$ for one or more qubits 105 in a chain 110. In these examples, the qubit 105*a* is in a first chain 110*a* implemented in a first ion trap, and the probing qubit 105*b* is in a second chain 110*b* implemented in a second ion trap positioned adjacent to or nearby the first ion trap such that the probing qubit 105*b* experiences the same environmental conditions as the qubit 105*a* (e.g., the same local magnetic field 315). Alternatively, the first chain 110*a* and the second chain 110*b* in the diagrams 300*b* and 300*c* may be implemented in different regions of the same ion trap.

It is to be understood that the local magnetic field 315 may cover multiple qubits 105*a* and that the stabilization mechanism described in connection with the diagrams 300*a*-300*c* can be used to stabilize more than one qubit 105*a*. Similarly, it may be possible to probe multiple probing qubits 105*b* to produce the information necessary to generate canceling or nulling magnetic fields.

Figure 4A:
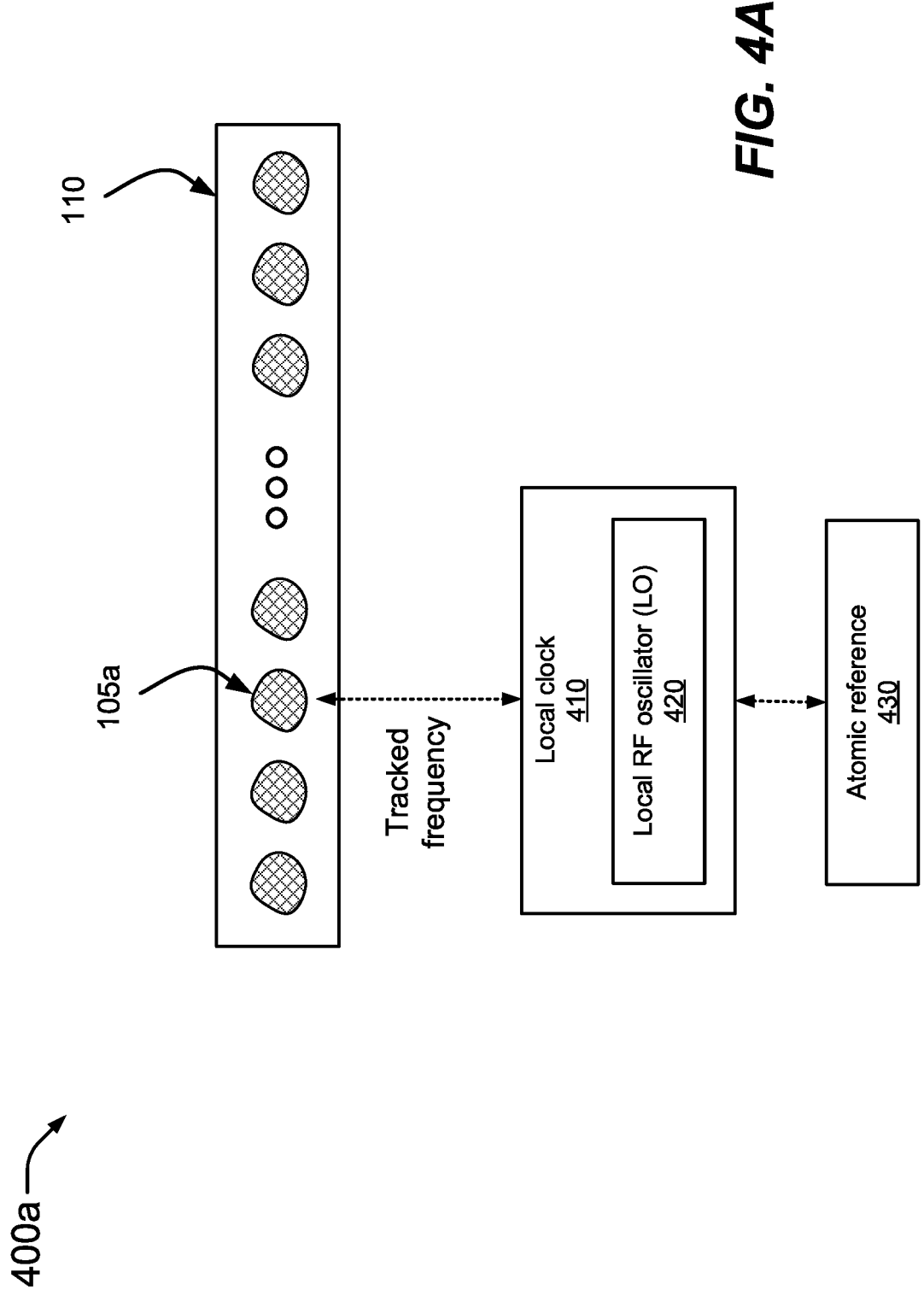
Figure 4B:
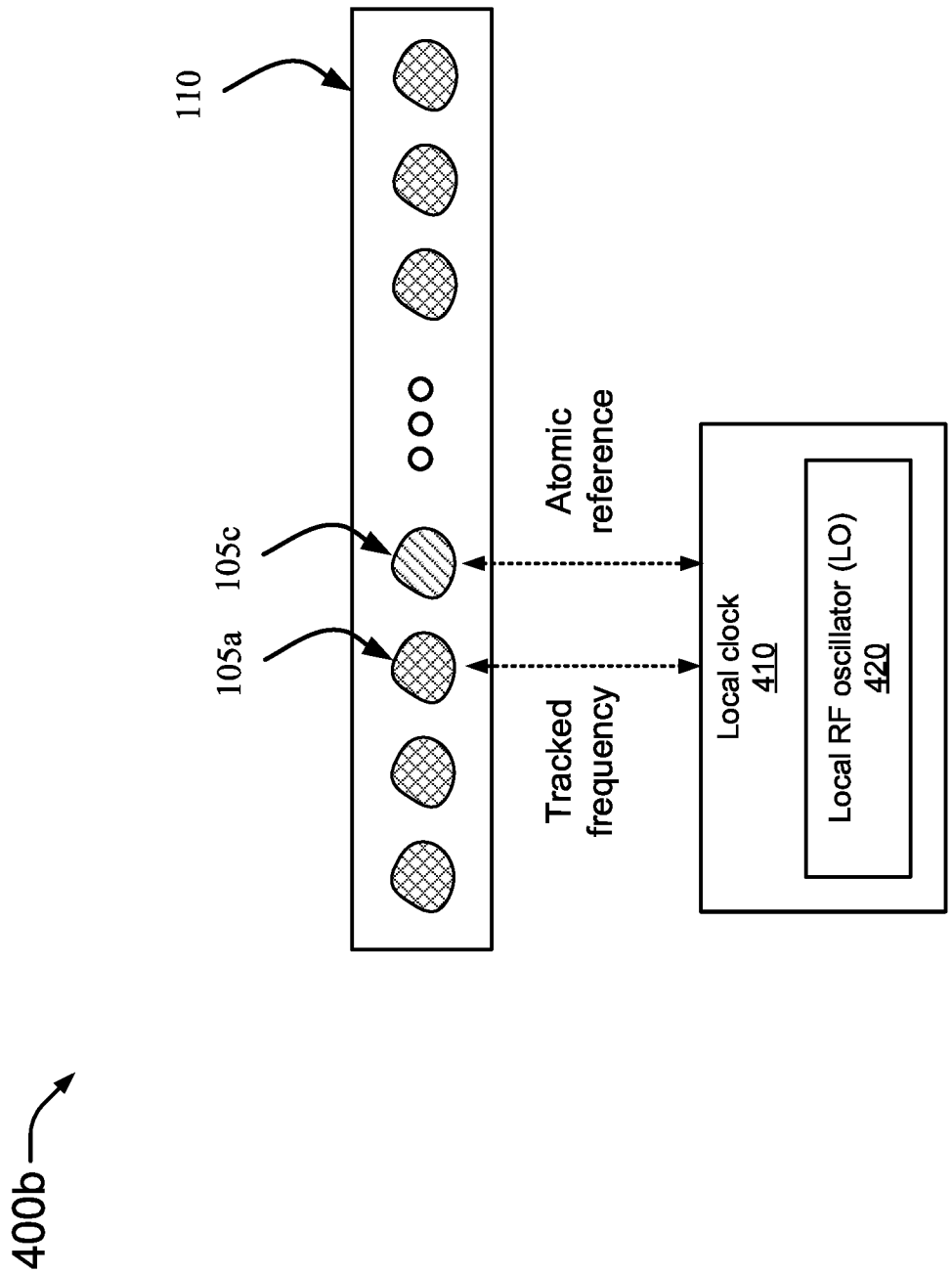

FIGS. 4A-4C shows diagrams 400*a*-400*c*, respectively, which illustrate various examples of using a collocated atomic hyperfine qubit as a frequency reference in accordance with aspects of this disclosure. Currently, for a local oscillator in a local clock, a stable oscillator is locked to an atomic source (such as Rb) that is commercially available to keep track of the qubit frequency. The current qubit coherence time is limited by the relative stability between the Rb atomic reference and the qubit states. A different approach is then to use one or more nearby qubits (experiencing the same environment such as the magnetic field) as a frequency reference to lock the local oscillator, which will eliminate any differential shifts of the energy levels arising from the qubit and the atomic reference (Rb in current setups). Essentially, by using the qubits themselves as the frequency reference, coherence may be maintained indefinitely, to the precision with which the local oscillator can be locked to the qubit atomic reference.

The diagram 400*a* describes a typical implementation in which an atomic reference (e.g., a Cs atomic clock or Rb atomic clock) is used and a local RF oscillator (LO) 420 in a local clock 410 locks to a reference frequency provided by the atomic reference 430. How well these two are tied together may affect the overall performance of the system.

The local clock 410 can then be used to track oscillations (e.g., track a frequency) in a qubit 105*a* (e.g., an atomic hyperfine qubit) in a chain 110. As described above, changes in the energy difference in the qubit 105*a* due to environmental conditions may cause the qubit 105*a* and the local clock 410 to dephase.

The diagram 400*b* describes an implementation of a stabilization technique for reducing or eliminating dephasing by improving coherence and the overall time scale of $T_2$ for one or more qubits 105 in the chain 110. In this example, instead of tying the local clock 410 and the local RF oscillator 420 to a commercial atomic reference (e.g., a Cs atomic clock or Rb atomic clock), they are instead tied to a qubit 105*c* in the chain 110 (also referred to as a reference qubit 105*c*). In such an implementation, dephasing is less likely to occur because any fluctuations in the qubit 105*a* caused by environmental conditions are also experienced by the reference qubit 105*c*.

The diagram 400*c* shows another implementation, similar to the one in the diagram 400*b*, in which the qubit 105*a* is in a first chain 110*a* implemented in a first ion trap, and the reference qubit 105*c* is in a second chain 110*b* implemented in a second ion trap positioned adjacent to or nearby the first ion trap such that the reference qubit 105*c* experiences the same environmental conditions as the qubit 105*a*. Again, dephasing is less likely to occur because any fluctuations in the qubit 105*a* caused by environmental conditions are also experienced by the reference qubit 105*c*. Alternatively, the first chain 110a and the second chain 110b in the diagram 400c may be implemented in different regions of the same ion trap.

It is to be understood that the techniques described in connection with FIGS. 3A-3C and FIGS. 4A-4C may be combined such that a probing qubit 106b may be used to measure or probe local environmental conditions to cancel or null their effects and also a reference qubit 105c may be used as an atomic frequency reference for a local clock or local oscillator. The probing qubit 105b and the reference qubit 105c may be different qubits or may be the same qubit, in terms of the atomic species or isotope.

Figure 5:
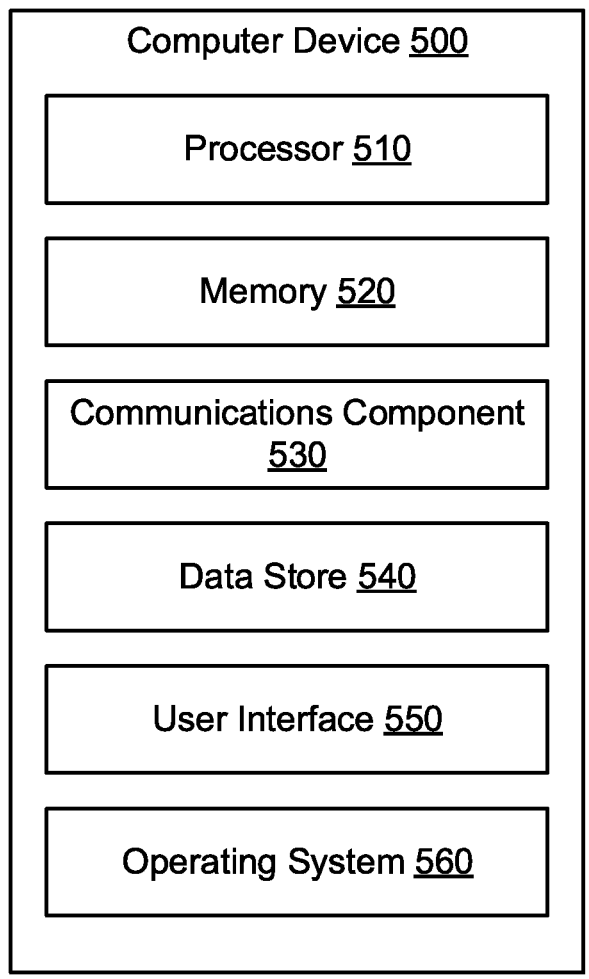
FIG. 5 is a diagram that illustrates an example of a computer device in accordance with aspects of this disclosure.

Referring now to FIG. 5, an example of a computer device 500 is shown. The computer device 500 can represent a single computing device, multiple computing devices, or a distributed computing system, for example. The computer device 500 may be configured as a quantum computer (e.g., a quantum information processing (QIP) system), a classical computer, or a combination of quantum and classical computing functions. For example, the computer device 500 may be used to process information using quantum algorithms based on trapped ion technology and may therefore implement methods or techniques that involve an active stabilization of coherent controllers using nearby qubits (e.g., to improve $T_2$ time scales). The computer device 500 may also implement techniques that improve $T_1$ time scales, such as better vacuum techniques. A generic example of the computer device 500 as a QIP system that can implement the various techniques described herein is illustrated in an example shown in FIG. 6.

The computer device 500 may include a processor 510 for carrying out processing functions associated with one or more of the features described herein. The processor 510 may include a single or multiple set of processors or multi-core processors. Moreover, the processor 510 may be implemented as an integrated processing system and/or a distributed processing system. The processor 510 may include a central processing unit (CPU), a quantum processing unit (QPU), a graphics processing unit (GPU), or combination of those types of processors. When supporting quantum operations, the processor 510 may at least include trapped ions to implement the quantum operations. In one aspect, the processor 510 may refer to a general processor of the computer device 500, which may also include additional processors 510 to perform more specific functions such as functions for active stabilization of coherent controllers using nearby qubits, which may involve one or both of cancelation or nulling of local environmental conditions in qubits or the use of qubits as atomic frequency references instead of commercially available atomic clocks.

In an example, the computer device 500 may include a memory 520 for storing instructions executable by the processor 510 for carrying out the functions described herein. In an implementation, for example, the memory 520 may correspond to a computer-readable storage medium that stores code or instructions to perform one or more of the functions or operations described herein. In one example, the memory 520 may include instructions to perform aspects of a method 700 and a method 800 described below in connection with FIGS. 7 and 8, respectively. Just like the processor 510, the memory 520 may refer to a general memory of the computer device 6500, which may also include additional memories 520 to store instructions and/or data for more specific functions such as instructions and/or data for active stabilization of coherent controllers using nearby qubits.

Further, the computer device 500 may include a communications component 530 that provides for establishing and maintaining communications with one or more parties utilizing hardware, software, and services as described herein. The communications component 530 may carry communications between components on the computer device 600, as well as between the computer device 500 and external devices, such as devices located across a communications network and/or device serially or locally connected to computer device 500. For example, the communications component 530 may include one or more buses, and may further include transmit chain components and receive chain components associated with a transmitter and receiver, respectively, operable for interfacing with external devices.

Additionally, the computer device 500 may include a data store 540, which can be any suitable combination of hardware and/or software, that provides for mass storage of information, databases, and programs employed in connection with implementations described herein. For example, the data store 540 may be a data repository for operating system 560 (e.g., classical OS, or quantum OS). In one implementation, the data store 540 may include the memory 520.

The computer device 500 may also include a user interface component 550 operable to receive inputs from a user of the computer device 500 and further operable to generate outputs for presentation to the user or to provide to a different system (directly or indirectly). The user interface component 550 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 550 may include one or more output devices, including but not limited to a display, a speaker, a haptic feedback mechanism, a printer, any other mechanism capable of presenting an output to a user, or any combination thereof.

In an implementation, the user interface component 550 may transmit and/or receive messages corresponding to the operation of the operating system 560. In addition, the processor 510 may execute the operating system 560 and/or applications or programs, and the memory 520 or the data store 540 may store them.

When the computer device 500 is implemented as part of a cloud-based infrastructure solution, the user interface component 550 may be used to allow a user of the cloud-based infrastructure solution to remotely interact with the computer device 500.

Figure 6:
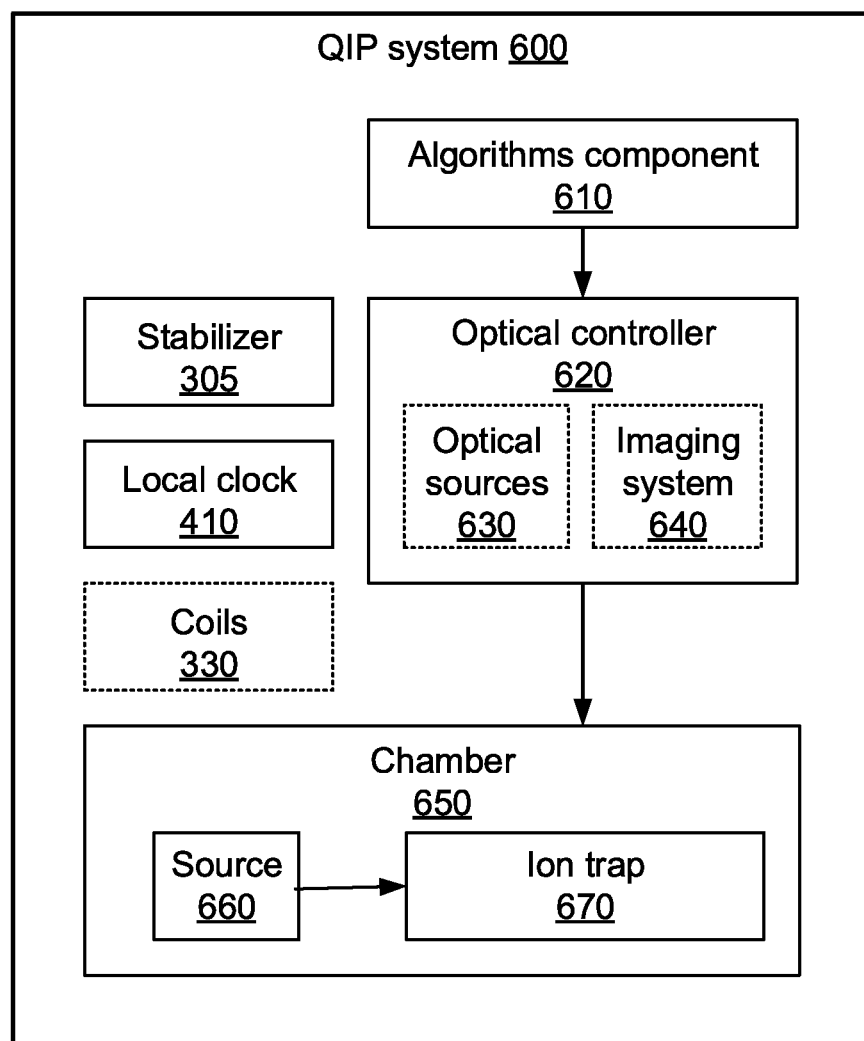
FIG. 6 is a block diagram that illustrates an example of a quantum information processing (QIP) system in accordance with aspects of this disclosure.

FIG. 6 is a block diagram that illustrates an example of a QIP system 600 in accordance with aspects of this disclosure. The QIP system 600 may also be referred to as a quantum computing system, a computer device, or the like. In an aspect, the QIP system 600 may correspond to portions of a quantum computer implementation of the computer device 500 in FIG. 5. Moreover, aspects of the diagrams 300a, 300b, 300c, 400a, 400b, and 400c may be included in the QIP system 600. For example, aspects of these diagrams may be implemented in a chamber 650, or in connection with the chamber 650, of the QIP system 600.

The QIP system 600 can include a source 660 that provides atomic species (e.g., a flux of neutral atoms) to the chamber 650 (e.g., vacuum chamber associated with the chain 110 in FIG. 1) having an ion trap 670 that traps the atomic species once ionized (e.g., photoionized) by an optical controller 620. Optical sources 630 in the optical controller 620 may include one or more laser sources (e.g., sources of optical or laser beams) that can be used for ionization of the atomic species, control of the atomic ions, for fluorescence of the atomic ions that can be monitored and tracked by image processing algorithms operating in an imaging system 640 in the optical controller 620, and/or to perform the tracking, probing, and/or measurement functions described herein. In an aspect, the optical sources 630 may be implemented separately from the optical controller 620.

The imaging system 640 can include a high-resolution imager (e.g., CCD camera) for monitoring the atomic ions while they are being provided to the ion trap or after they have been provided to the ion trap 670. In an aspect, the imaging system 640 can be implemented separate from the optical controller 620, however, the use of fluorescence to detect, identify, and label atomic ions using image processing algorithms may need to be coordinated with the optical controller 620.

The QIP system 600 may also include an algorithms component 610 that may operate with other parts of the QIP system 600 (not shown) to perform quantum algorithms or quantum operations, including a stack or sequence of combinations of single qubit operations and/or multi-qubit operations (e.g., two-qubit operations) as well as extended quantum computations. As such, the algorithms component 610 may provide instructions to various components of the QIP system 600 (e.g., to the optical controller 620) to enable the implementation of the quantum algorithms or quantum operations, and consequently, implement the various techniques described herein to enhance the quality of the qubits.

Also shown in FIG. 6 as part of the QIP system 600 are the stabilizer 305, the local clock 410, and the coils 330. The stabilizer 305 and the local clock 410 may operate in connection with other components or sub-components of the QIP system 600, including for example, the optical controller 620 and the chain of ions that is formed in the ion trap 670. The coils 330 may be placed in different places in the QIP system 600 and in some implementations, there may be coils positioned outside and/or within the chamber 650.

Figure 7:
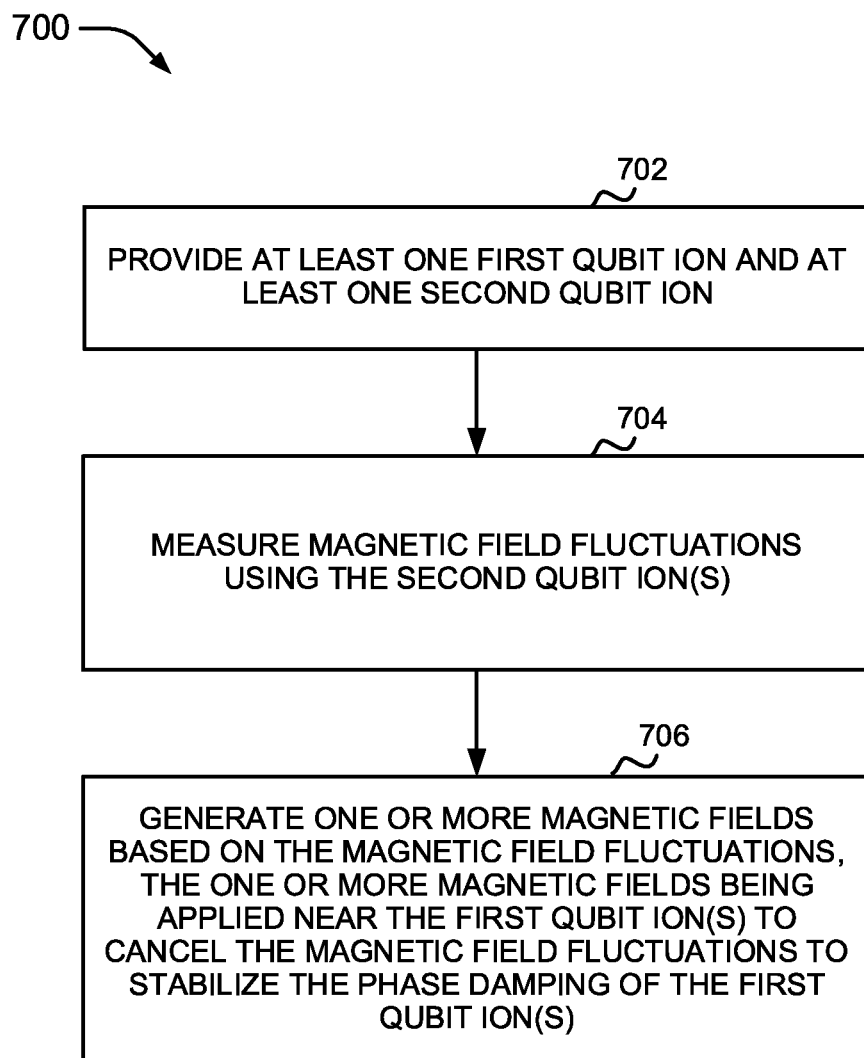
FIGS. 7 and 8 are flow diagrams that illustrates examples of methods for stabilizing phase damping in qubits in accordance with aspects of this disclosure

Referring to FIG. 7, a method 700 is described for stabilizing phase damping in qubits (e.g., for improving $T_2$ time scales of qubits). In an aspect, the method 700 may be performed in a computer system such as the computer device 500 described above, where, for example, the processor 510, the memory 520, the data store 540, and/or the operating system 560 may be used to perform the functions of the method 700. Similarly, the functions of the method 700 may be performed by one or more components of a QIP system such as the QIP system 600 and its components (e.g., the stabilizer 305, the optical controller 620). Thus, each aspect described herein in connection with the method 700 may be implemented, either alone or in combination with another aspect, in the computer device 500 and in the QIP system 600.

At 702, the method 700 includes providing a first qubit ion and a second qubit ion (see e.g., the qubits 105a and 105b in FIGS. 3A-3C).

At 704, the method 700 includes measuring magnetic field fluctuations using the second qubit ion (see e.g., the stabilizer 305 and the local magnetic field measurement component 310 in FIGS. 3A-3C).

At 706, the method 700 includes generating one or more magnetic fields based on the measured magnetic field fluctuations, the one or more magnetic fields being applied near the first qubit ion to cancel the magnetic field fluctuations to stabilize the phase damping of the first qubit ion (see e.g., the stabilizer 305, the canceling magnetic field generation component 320, and the coils 330 in FIGS. 3A-3C).

It is to be understood that while the method 700 is described in connection with one first qubit ion and one second qubit ion, the method 700 need not be so limited and can be performed with one or more first qubit ions and one or more second qubit ions. For example, the method 700 may be performed with at least one first qubit ion and one second qubit ion, with one first qubit ion and at least one second qubit ion, or with at least one first qubit ion and at least one second qubit ion.

In an aspect of the method 700, the first qubit ion and the second qubit ion are atomic hyperfine qubits.

In an aspect of the method 700, the first qubit ion and the second qubit ion are made of a same atomic ion or a same atomic species (e.g., they are both Ytterbium atom-based qubits).

In an aspect of the method 700, the first qubit ion and the second qubit ion are made of different atomic ions or different atomic species.

In an aspect of the method 700, the first qubit ion and the second qubit ion are atomic hyperfine qubits, and the first qubit ion is addressable with a first wavelength of light and the second qubit ion is addressable with a second wavelength of light different from the first wavelength of light. In an example, the first qubit ion is made from $^{171}Yb^+$ and the second qubit ion is made from $^{133}Ba^+$.

In an aspect of the method 700, the first qubit and the second qubit are co-trapped in a same ion trap (see e.g., FIG. 3A).

In an aspect of the method 700, the first qubit is trapped in a first ion trap and the second qubit is trapped in a second ion trap adjacent to the first ion trap (see e.g., FIGS. 3B and 3C).

In an aspect of the method 700, the second qubit ion has energy levels that are sensitive to magnetic fields, and measuring the magnetic field fluctuations using the second qubit ion includes measuring the magnetic field fluctuations using the energy levels of the second qubit ion that are sensitive to the magnetic fields. The second qubit ion can have other energy levels that are insensitive to magnetic fields. The energy levels that are sensitive to magnetic field can include Zeeman levels, for example. Moreover, measuring the magnetic field fluctuations using the second qubit ion includes optically probing the energy levels of the second qubit ion that are sensitive to magnetic fields to detect characteristics of the magnetic field fluctuations (e.g., by using the optical controller 620 to perform the optical probing).

In an aspect of the method 700, the magnetic field fluctuations include 60 Hz noise. In other instances, the noise could be 50 Hz, 100 Hz, and/or 120 Hz noise.

In an aspect of the method 700, the method 700 may further comprise providing a magnetic shield (e.g., the magnetic field shield 340) configured to reduce the magnetic field fluctuations near the first qubit ion and the second qubit ion, where the magnetic shield is made of a material with high magnetic permeability including one or more of mu-metal, highly conductive copper, or a superconducting material at cryogenic temperatures.

In an aspect of the method 700, a sequence of measuring the magnetic field fluctuations and generating the one or more magnetic fields to cancel the magnetic field fluctuations is repeated as part of a feedback loop. In some implementations, the feedback loop can have a bandwidth of at least 1 KHz.

In an aspect of the method 700, the first qubit ion is configured to participate in a quantum computation and the second qubit ion is a spectator qubit that is not configured to participate in the quantum computation.

In an aspect of the method 700, the method 700 further includes providing one or more additional qubit ions (e.g., in addition to the first qubit ion and the second qubit ion), where the one or more magnetic fields are applied near the first qubit ion and the one or more additional qubit ions to cancel the magnetic field fluctuations to stabilize the phase damping of the first qubit ion and of the one or more additional qubit ions. The one or more additional qubit ions may be in the same ion trap as the first qubit ion or in a nearby ion trap.

In connection with the method 700, a QIP system may be used to perform such a method. The QIP system can be an implementation of the QIP system 600 that includes at least one ion trap (e.g., one or more ion traps 670) having a first qubit ion and a second qubit ion, one or more coils (e.g., one or more coils 330), and a stabilizer (e.g., the stabilizer 305) for stabilizing phase damping in qubits. In this implementation, the stabilizer is configured to measure magnetic field fluctuations using the second qubit ion (e.g., by the local magnetic field measurement component 310 in the stabilizer 305), and generate, using the one or more coils, one or more magnetic fields based on the measured magnetic field fluctuations (e.g., by the canceling magnetic field generation component 320 in the stabilizer 305), the one or more magnetic fields being applied (e.g., by the coils 330) near the first qubit ion to cancel the magnetic field fluctuations to stabilize the phase damping of the first qubit ion.

In addition, the method 700 for stabilizing phase damping in qubits may be implemented by a computer-readable storage medium storing code (e.g., the memory 520 and/or the data store 540) with instructions executable by a processor (e.g., the processor 510).

Figure 8:
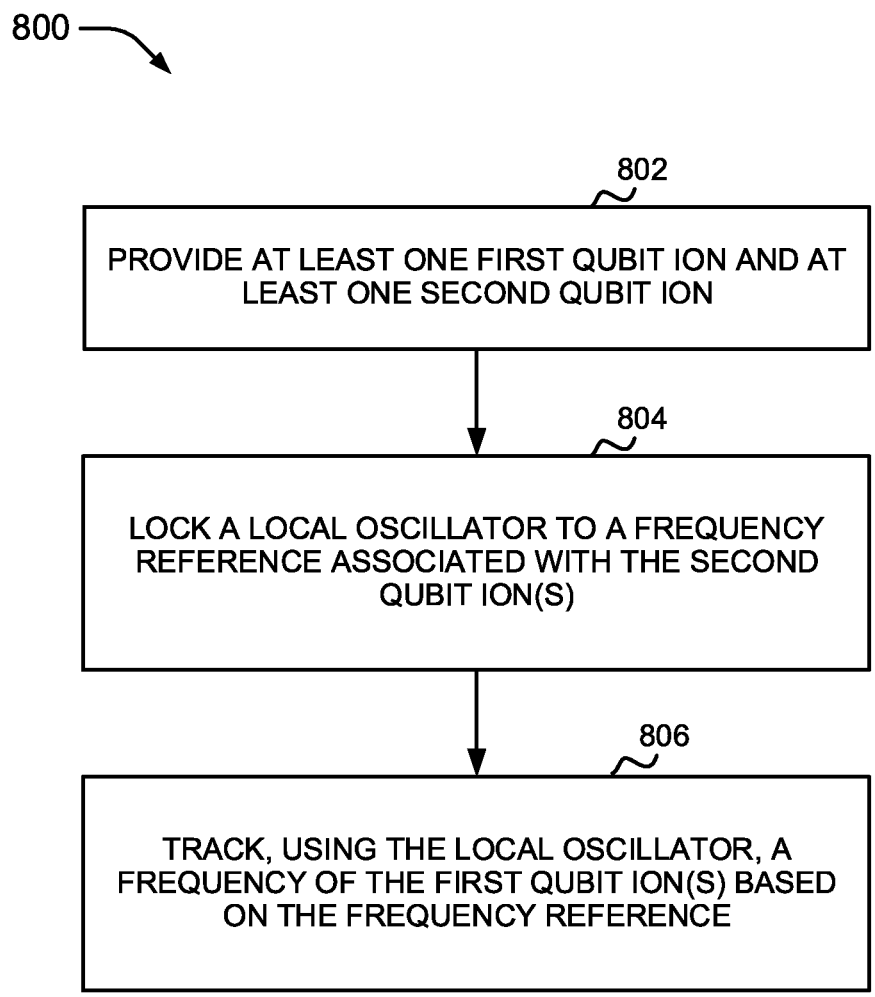

Referring to FIG. 8, a method 800 is described for stabilizing phase damping in qubits (e.g., for improving $T_2$ time scales). In an aspect, the method 800 may be performed in a computer system such as the computer device 500 described above, where, for example, the processor 510, the memory 520, the data store 540, and/or the operating system 560 may be used to perform the functions of the method 700. Similarly, the functions of the method 800 may be performed by one or more components of a QIP system such as the QIP system 600 and its components (e.g., the stabilizer 305, the optical controller 620). Thus, each aspect described herein in connection with the method 800 may be implemented, either alone or in combination with another aspect, in the computer device 500 and in the QIP system 600.

At 802, the method 800 includes providing a first qubit ion and a second qubit ion (see e.g., the qubits 105a and 105c in FIGS. 4B and 4C).

At 804, the method 800 includes locking a local oscillator to a frequency reference associated with the second qubit ion (see e.g., the local RF oscillator 420 in local clock 410 locked to atomic reference provided by the qubit 105c in FIGS. 4B and 4C).

At 806, the method 800 includes tracking, using the local oscillator, a frequency of the first qubit ion based on the frequency reference (see e.g., tracking of the qubit 105a by the local RF oscillator 420 in the local clock 410).

It is to be understood that while the method 800 is described in connection with one first qubit ion and one second qubit ion, the method 800 need not be so limited and can be performed with one or more first qubit ions and one or more second qubit ions. For example, the method 800 may be performed with at least one first qubit ion and one second qubit ion, with one first qubit ion and at least one second qubit ion, or with at least one first qubit ion and at least one second qubit ion.

In an aspect of the method 800, the first qubit ion and the second qubit ion have the same atomic hyperfine structure.

In an aspect of the method 800, the first qubit ion and the second qubit ion are different ion species.

In an aspect of the method 800, the first qubit ion and the second qubit ion have atomic hyperfine structures and are addressable with different wavelengths of light.

In an aspect of the method 800, the first qubit ion is made from $^{171}Yb^+$ and the second qubit ion is made from $^{133}Ba^+$.

In an aspect of the method 800, the first qubit ion and the second qubit ion are close to each other and experience substantially the same environmental fluctuations. The first qubit ion and the second qubit ion are close to each other by being in a same ion trap or in separate but adjacent ion traps.

In an aspect of the method 800, the method 800 further includes measuring magnetic field fluctuations using the second qubit ion (e.g., by the local magnetic field measurement component 310 in the stabilizer 305), and generating one or more magnetic fields based on the measured magnetic field fluctuations (e.g., by the canceling magnetic field generation component 320 in the stabilizer 305), the one or more magnetic fields being applied (e.g., by the coils 330) near the first qubit ion to cancel the magnetic field fluctuations.

In connection with the method 800, a QIP system may be used to perform such a method. The QIP system can be an implementation of the QIP system 600 that includes at least one ion trap (e.g., one or more ion traps 670) having a first qubit ion and a second qubit ion and a local oscillator (e.g., the local RF oscillator 420), where the local oscillator is locked to a frequency reference associated with the second qubit ion, and where the local oscillator is configured to track a frequency of the first qubit ion based on the frequency reference.

In addition, the method 800 for stabilizing phase damping in qubits may be implemented by a computer-readable storage medium storing code (e.g., the memory 520 and/or the data store 540) with instructions executable by a processor (e.g., the processor 510).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A trapped ion quantum information processing (QIP) system comprising:
   at least one ion trap including at least one first qubit ion and at least one second qubit ion; and
   a local oscillator that is locked to a frequency reference associated with the at least one second qubit ion, the local oscillator being configured to track a frequency of the at least one first qubit ion based on the locked frequency reference.

2. The trapped ion QIP system of claim 1, wherein the at least one first qubit ion and the at least one second qubit ion have a same atomic hyperfine structure.

3. The trapped ion QIP system of claim 1, wherein the at least one first qubit ion and the at least one second qubit ion are different ion species.

4. The trapped ion QIP system of claim 1, wherein the at least one first qubit ion and the at least one second qubit ion have atomic hyperfine structures and are addressable with different wavelengths of light.

5. The trapped ion QIP system of claim 1, wherein the at least one first qubit ion is made from $^{171}Yb^+$ and the at least one second qubit ion is made from $^{133}Ba^+$.

6. The trapped ion QIP system of claim 1, wherein the at least one first qubit ion and the at least one second qubit ion are close to each other in the at least one ion trap and experience substantially a same environmental fluctuations.

7. The trapped ion QIP system of claim 1, further comprising:
a stabilizer configured to measure magnetic field fluctuations using the at least second qubit ion, and generate one or more magnetic fields based on the measured magnetic field fluctuations; and
coils configured to apply the one or more magnetic fields applied near the at least one first qubit ion to cancel the magnetic field fluctuations.

8. The trapped ion QIP system of claim 7, wherein the one or more magnetic fields are generated based on the measured magnetic field fluctuations by a canceling magnetic field generation component in the stabilizer.

9. The trapped ion QIP system of claim 7, wherein the magnetic field fluctuation is measured using the at least second qubit ion by a local magnetic field measurement component in the stabilizer.

10. The trapped ion QIP system of claim 1, wherein the local oscillator is a radio frequency (RF) oscillator.

11. A method for stabilizing phase damping in qubits, comprising:
providing at least one first qubit ion and at least one second qubit ion;
locking a local oscillator to a frequency reference associated with the at least one second qubit ion; and
tracking, using the local oscillator, a frequency of the at least one first qubit ion based on the locked frequency reference.

12. The method of claim 11, wherein the at least one first qubit ion and the at least one second qubit ion have a same atomic hyperfine structure.

13. The method of claim 11, wherein the at least one first qubit ion and the at least one second qubit ion are different ion species.

14. The method of claim 11, wherein the at least one first qubit ion and the at least one second qubit ion have atomic hyperfine structures and are addressable with different wavelengths of light.

15. The method of claim 11, wherein the at least one first qubit ion is made from $^{171}Yb^+$ and the at least one second qubit ion is made from $^{133}Ba^+$.

16. The method of claim 11, wherein the at least one first qubit ion and the at least one second qubit ion are close to each other in at least one ion trap and experience substantially a same environmental fluctuations.

17. The method of claim 11, further comprising:
measuring magnetic field fluctuations using the at least second qubit ion; and
generating one or more magnetic fields based on the measured magnetic field fluctuations, wherein the one or more magnetic fields are being applied near the at least one first qubit ion to cancel the magnetic field fluctuations.

18. The method of claim 17, wherein the one or more magnetic fields are generated based on the measured magnetic field fluctuations by a canceling magnetic field generation component in the stabilizer.

19. The method of claim 17, wherein the magnetic field fluctuation is measured using the at least second qubit ion by a local magnetic field measurement component in the stabilizer.

20. The method of claim 11, wherein the local oscillator is a radio frequency (RF) oscillator.

* * * * *